(12) United States Patent
Peterreins

(10) Patent No.: US 6,809,440 B2
(45) Date of Patent: Oct. 26, 2004

(54) SPACE-SAVING, DAMPING COUPLING MECHANISM FOR WORMS IN GEARED ACTUATORS

(75) Inventor: Thomas K. Peterreins, Cary, NC (US)

(73) Assignee: Buehler Motor, Inc., Cary, NC (US)

( * ) Notice: Subject to any disclaimer, the term of this patent is extended or adjusted under 35 U.S.C. 154(b) by 38 days.

(21) Appl. No.: 10/383,744

(22) Filed: Mar. 10, 2003

(65) Prior Publication Data
US 2004/0178686 A1 Sep. 16, 2004

(51) Int. Cl.[7] .................. F16D 3/68; F16H 55/14; B60J 1/00; E05F 15/16; H02K 51/00
(52) U.S. Cl. .................. 310/51; 310/75 D; 74/425; 74/411
(58) Field of Search .................. 310/75 D, 51, 310/75 R; 464/92; 74/411, 406, 425, 10.85

(56) References Cited

U.S. PATENT DOCUMENTS

| | | | | |
|---|---|---|---|---|
| 2,025,825 A | * | 12/1935 | Ricefield | 464/73 |
| 3,396,556 A | * | 8/1968 | Giegerich | 464/73 |
| 3,636,729 A | | 1/1972 | Patel | |
| 3,724,239 A | * | 4/1973 | Calistrat | 464/92 |
| 3,895,502 A | | 7/1975 | Schwarz | |
| 3,941,339 A | * | 3/1976 | McCarty | 248/603 |
| 4,228,664 A | * | 10/1980 | McCoy | 464/92 |
| 4,464,142 A | * | 8/1984 | Bridges et al. | 464/92 |
| 4,728,832 A | * | 3/1988 | Jatnieks et al. | 310/41 |
| 4,748,865 A | * | 6/1988 | Umezawa et al. | 74/411 |
| 5,178,026 A | * | 1/1993 | Matsumoto | 74/411 |
| 5,233,879 A | * | 8/1993 | Watanuki et al. | 74/425 |
| 5,564,981 A | * | 10/1996 | Iwabuchi et al. | 464/73 |
| 5,736,798 A | * | 4/1998 | O'Brien et al. | 310/51 |
| 5,873,786 A | * | 2/1999 | Hosoya et al. | 464/73 |
| 6,045,448 A | | 4/2000 | Kern et al. | |
| 6,169,346 B1 | * | 1/2001 | Nakamura et al. | 310/75 D |
| 6,223,614 B1 | | 5/2001 | Takiguchi et al. | |
| 6,291,920 B1 | * | 9/2001 | Miller et al. | 310/261 |
| 6,581,267 B1 | * | 6/2003 | Olbrich | 29/450 |

FOREIGN PATENT DOCUMENTS

| | | | | |
|---|---|---|---|---|
| JP | 60065938 | * | 4/1985 | F16H/1/06 |
| JP | 06033994 | | 2/1994 | |

* cited by examiner

*Primary Examiner*—B Mullins
*Assistant Examiner*—Heba Elkassabgi
(74) *Attorney, Agent, or Firm*—Jacobson Holman PLLC

(57) ABSTRACT

A transmission member for a worm gear having a thrust ring placed over the shaft of a motor. The worm gear is slip-fit over the shaft and has a coupling head with a pair of projections facing away from the motor. A coupling washer is press-fit onto the motor shaft and has a pair of projections as well, each of which is fitted with an O-ring. The coupling washer is mated to the worm gear so both sets of projections intermesh and form a torque-transmitting arrangement, with the O-rings acting as a buffer between the two sets of projections and allowing the motor shaft to turn relative to the worm for a fraction of a revolution to gain inertia and speed helpful to break loose a jammed gear train.

11 Claims, 3 Drawing Sheets

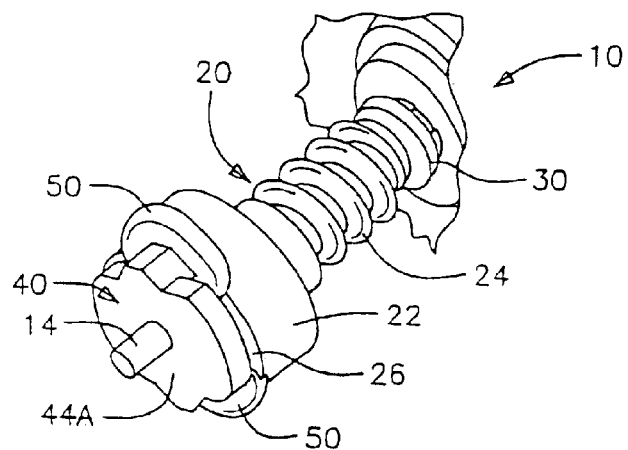
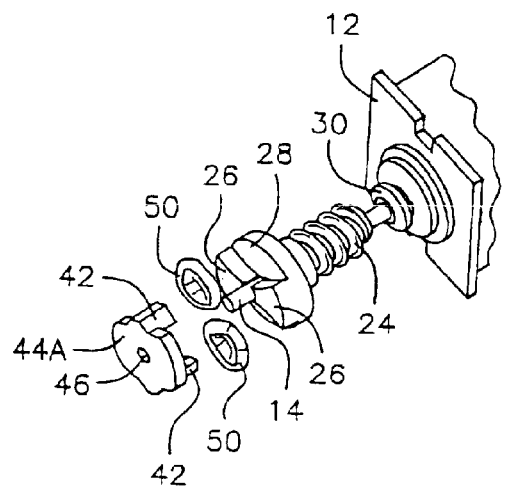
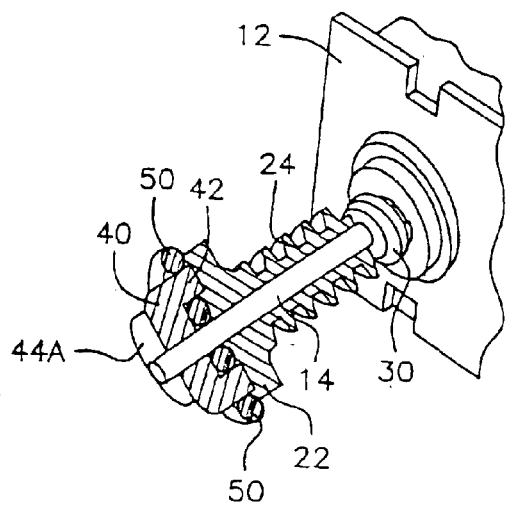

SPACE-SAVING, DAMPING COUPLING MECHANISM FOR WORMS IN GEARED ACTUATORS

BACKGROUND OF THE INVENTION

1. Field of the Invention

The present invention is related to the field of transmission members for worm gears and, more particularly, to a compact damping coupling mechanism for worms in geared actuators.

2. Description of the Related Art

A wide range of couplings and dampeners are known in the art. Dampeners are normally employed to reduce the shock loads when an actuator runs into a hard stop, and are made from rubber-like material that absorbs some of the shock energy. Couplings are used to allow the motor to run freely in the opposite direction after running into the hard stop, thereby building up some energy to break loose from a stall condition as the gear train, especially with worm gears, may have locked up due to the stall load.

Couplings and dampeners are normally employed between the worm and the motor, thus forcing the worm to be at a certain minimal distance from the motor, moving out the mating helical gear with the worm and wasting some space. In addition, couplings and damping elements are typically purchased components which thereafter require assembly to the motor shaft and the worm. A further disadvantage of such prior art elements lies in the fact that since the coupling/dampener is situated between the worm and the motor, the worm must be on a separate shaft, increasing the number of parts required for a complete assembly.

SUMMARY OF THE INVENTION

In view of the foregoing, one object of the present invention is to overcome the difficulties of high impact loads and break-free problems associated with a worm mounted to the shaft of a DC motor.

Another object of the invention is to provide a damping coupling mechanism that requires a minimal number of parts, simplifying manufacturing and reducing cost.

A further object of the invention is a damping coupling mechanism for worms in geared actuators in which the worm gearing is located adjacent the motor, reducing space requirements.

Yet a further object of the invention is an integrated damping and coupling assembly that utilizes many standard parts to ease manufacturing requirements and minimize cost.

In accordance with this and other objects, the present invention is directed to a space-saving damping coupling assembly for use in geared actuators. The damping coupling assembly includes a worm, a thrust ring, a coupling washer and O-rings. The thrust ring is press-fitted to the motor shaft closest to the motor, followed by the slip-fit worm. The worm is held in place on the shaft by the coupling washer. Coupling elements on the worm fit cooperatively with torque-transmitting portions on the washer, with the interface between the worm and washer being cushioned by the O-rings fitted to the torque-transmitting portions. Torque from rotation of the motor shaft is transmitted to the worm through the washer, with the O-rings compressing to absorb shock. Before transmitting torque, the motor shaft is allowed to turn relative to the worm for a fraction of a revolution to gain inertia and speed to break loose a jammed gear train.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a coupling assembly in accordance with the present invention;

FIG. 2 is an exploded view of the coupling assembly of FIG. 1;

FIG. 3 is a cross-sectional view of the coupling assembly of FIG. 1;

DETAILED DESCRIPTION OF THE PREFERRED EMBODIMENTS

Figure 4:
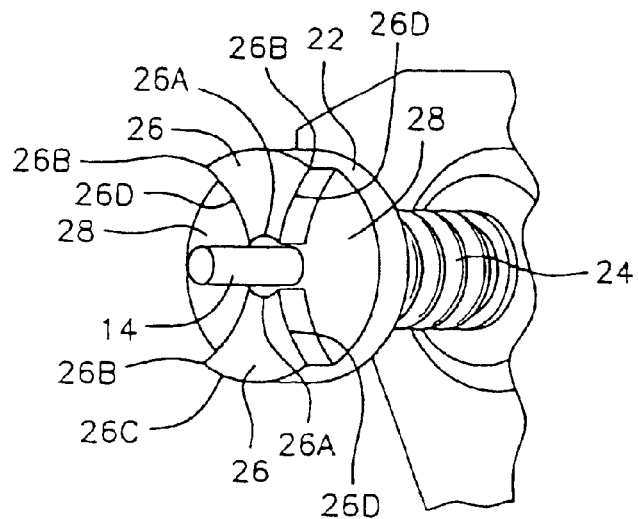
FIG. 4 is a perspective view of the worm as mounted on the motor shaft in accordance with the present invention.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As shown in FIGS. 1–4, the present invention is directed to a coupling assembly, generally designated by the reference numeral 10, which is mounted immediately adjacent a motor 12 on a motor shaft 14. The assembly 10 includes a worm 20, generally designated by the reference numeral 20, an annular thrust ring 30, a coupling washer, generally designated by the reference numeral 40, and O-rings 50. As can be seen in FIG. 3, the inner diameter of the worm 20 is larger than the outer diameter of the shaft 14 so that the worm rides on the shaft with a slip fit. The worm is held in place axially by means of the thrust ring 30 on one side, and the coupling washer 40 on the other side. Each of the thrust ring 30 and the coupling washer 40 are press fit onto the motor shaft 14.

The worm 20 includes a head portion 22 and a helical geared portion 24. The head portion 22 includes coupling elements 26 which are raised relative to an outer planar surface 28 of the head portion. The outer planar surface 28 is substantially perpendicular to the longitudinal axis of the helical geared portion 24 and generally cylindrical. The coupling elements 26 fit cooperatively with mating portions of the washer 40, transmitting torque from the motor shaft 14 to the worm 20.

As shown in FIG. 4, the coupling elements 26 have a generally triangular shape as viewed perpendicular to the outer surface 28, with an inner truncated vertex 26A and two outer vertices 26B. The peripheral convex outside edge 26C of each element 26 between the two outer vertices 26B is flush with the circumference of the head portion 22. The truncated inner vertex 26A is concave such that the coupling element has an inner curvature that approximates that of the shaft but does not contact the motor shaft 14. Alternatively, the inner vertex 26A may be constructed without truncation so as to have a structure like that of the outer vertices 26B. Two concave sides 26D join the inner vertex 26A with each of the two outer vertices 26B, respectively. The coupling elements 26 are preferably machined into the head portion 22 of the worm.

Figure 5:
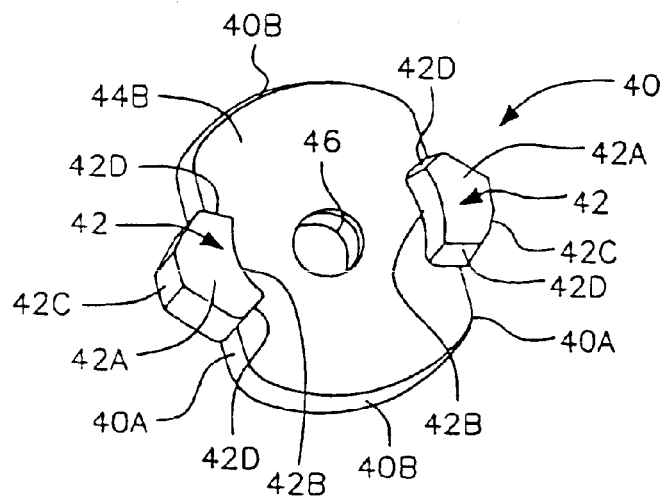
FIG. 5 is a perspective view of the inside face of the coupling washer, relative to the motor, of the coupling assembly of FIG. 1.

As shown in FIGS. 1, 2 and 5, the washer 40 has a flat outer face 44A generally parallel with an inner face 44B, and two straight, generally parallel, sides 40A joined by two slightly convex sides 40B. The outer face 44A may meet the sides 40A, 40B at substantially a right angle or the edge therebetween may be beveled. Protruding from each of the straight sides 40A is a torque-transmitting element, generally designated by the reference numeral 42, which also extends inwardly so as to project beyond the otherwise planar inner face 44B of the washer 40. In addition, the washer has a cylindrical central opening 46 to receive the motor shaft 14.

Each of the torque-transmitting elements 42 has a substantially planar inside face 42A, and side faces including a generally concave inner portion 42B nearest the central opening 46, and a generally convex portion 42C. An angular portion 42D joins each end of the concave portion 42B to an adjoining end of the convex portion 42C. The resulting structure is convexo-concave, i.e., the convex portion 42C of the side face has greater curvature than the concave portion 42B. The inside face 42A may meet the side face portions 42B, 42C, 42D at substantially a right angle or the edges therebetween may be beveled. The shape of the washer enables the torque-transmitting elements 42 to fit cooperatively between the coupling elements 26, with the inside faces 42A against the outer surface 28 of the head portion 22 of the worm 20.

Figure 6:
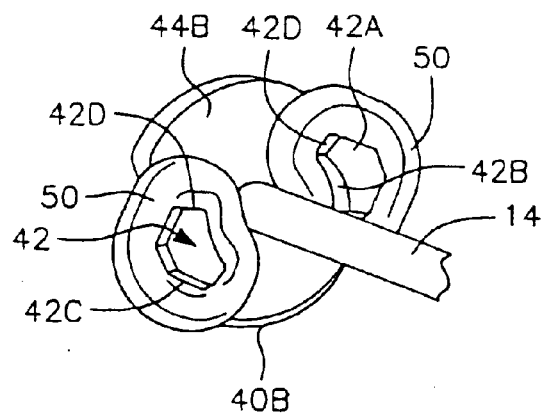
FIG. 6 is a perspective view of the coupling washer of FIG. 5, as mounted on the motor shaft with O-rings assembled therewith.

As illustrated in FIG. 6, standard annular O-rings are fitted on the torque-transmitting elements 42. The angular portions 42D of the torque-transmitting elements 42 orient corresponding portions of the O-rings advantageously to complement the curvature of the concave sides 26D of the coupling elements 26. Thus, the geometries of the torque-transmitting elements 42 and the coupling elements 26 are adapted to each other to ensure the O-rings are only compressed between flat or slightly curved faces, and thus not pinched and possibly damaged by an edge of these torque-transmitting features.

During assembly, the thrust ring 30 is pressed onto the motor shaft 14 toward, but not in contact with, the motor housing. The worm 20 is then slipped onto the shaft 14 with the coupling elements 26 facing away from the thrust ring 30. The O-rings 50 are fitted onto the torque-transmitting elements 42 of the coupling washer 40, and the washer 40 is then pressed onto the motor shaft, leaving sufficient axial clearance to allow the worm to turn within the limits of the coupling geometry. Additional wear washers (not shown), such as between the worm 20 and the coupling washer 40, may be added during this assembly sequence depending upon the expected life of the product.

In operation, the O-rings are compressed when torque is transmitted to the worm. In case of shock load, the O-rings are increasingly compressed as the torque becomes higher and higher. Due to the forgiveness of the O-rings, the peak torque, which determines the loading of adjacent components, e.g., the gears, bearings, motor shaft, casing and the coupling itself, is reduced.

The present invention is advantageous whether the motor shaft is running against a point contact outside the motor or internally within the motor housing. If the thrust from the worm is taken up by the ends of the motor shaft thrusting against an outside housing or casing, the diameter of the thrust face can be low, virtually a point contact, and will typically be no more than the outer diameter of the motor shaft. The inventive arrangement is particularly effective with such a configuration, i.e., with the motor is running against point contacts or small flat faces on its end, i.e., thrusting with the motor shaft ends, rather than against an internal contact inside the motor housing, because the least amount of force (voltage) is necessary to effectively break free, and friction generated by the thrust forces of the worm is minimized, maximizing thrust transference.

If, on the other hand, point contacts are not used and the motor takes up the thrust internally within the motor housing, a thrust ring mounted on the motor shaft is needed to transmit the force. Since such a thrust ring must be larger than the diameter of the motor shaft, more friction is generated. Nevertheless, the geometries of the torque-transmitting elements 42 and the coupling elements 26 still allow the motor shaft 14 to turn relative to the worm 20 for a fraction of a revolution to gain inertia and speed before the washer begins to transmit torque to drive the worm. This allowed movement, and the resulting inertia and speed gained thereby, facilitates breaking free from a stalled condition, e.g., a jammed gear train.

Figure 7:
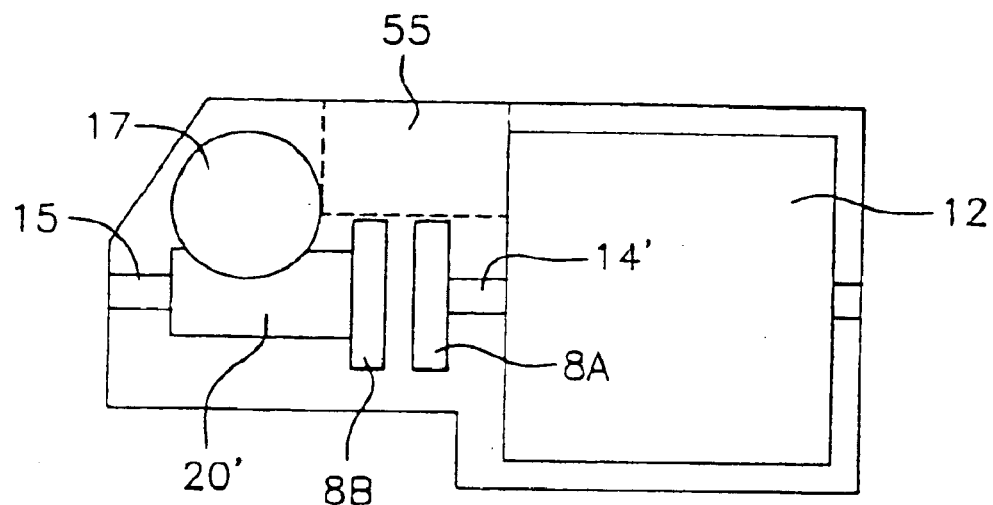
FIG. 7 is a block diagram of a conventional coupling and damping arrangement.

Another advantage realized through the inventive design is reduced space requirements. With conventional worm gears, representatively depicted in FIG. 7, the worm 20' and mating helical gear 17 are at a distance from the motor 12. The motor shaft 14' holds part of the coupling 8A, while the worm 20' and a mating coupling portion 8B are mounted on an auxiliary shaft 15. As can be seen, the spacing of the worm 20' and helical gear 17 from the motor 12 creates wasted space 55.

Figure 8:
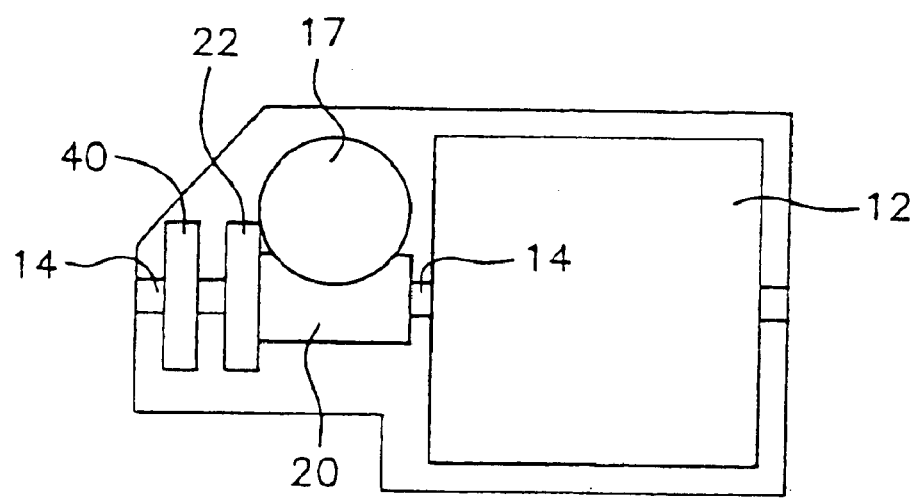
FIG. 8 is a block diagram showing the space-saving coupling assembly according to the present invention.

By contrast, the design of the present invention, shown in FIG. 8, positions the coupling and damping arrangement on the far end of the motor shaft 14, with the worm 20 then being as close to the motor 12 as the dimensions of the mating helical gear 17 will allow. The result is a very compact arrangement with no wasted space.

The coupling washer 40 is preferably made of sintered metal which allows a large design freedom in the geometry of the torque-transmitting elements 42 that transmit the torque and hold the O-rings. The worm is machined such that the mating geometry of the coupling elements 26 that receive the torque is easily manufactured in a shape that requires only a simple milling operation from two sides to achieve such coupling elements 26.

In summary, the present invention represents a space-saving arrangement that provides safe break-free capability from a jammed gear condition with a minimal amount of power. No separate is worm bearing system is necessary, and manufacture is simplified through machining of the worm with coupling features and the use of standard O-rings which obviates the need for custom molded damping elements.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A damping coupling mechanism for a geared actuator in a motor having a motor shaft, the mechanism comprising a worm slip-fit to the motor shaft and held axially thereon and against said motor by a washer secured to the motor shaft, said worm having a coupling element that fits cooperatively with a torque-transmitting element of said washer, said torque-transmitting element fitted with a shock-absorbing member that contacts said coupling element, whereby torque is transmitted from said motor shaft and said press-fit washer to said worm through said shock-absorbing member.

2. The damping coupling mechanism as set forth in claim 1, further comprising a thrust ring, press-fit to said motor shaft between said worm and said motor.

3. The damping coupling mechanism as set forth in claim 1, wherein said torque-transmitting element includes two projections, said shock-absorbing member including two O-rings, each fitted over a respective one of said two projections.

4. The damping coupling mechanism as set forth in claim 3, wherein said coupling element includes a pair of projections that intermesh with said two projections on said washer, said O-rings acting as a buffer therebetween.

5. The damping coupling mechanism as set forth in claim 1, wherein said washer is fitted onto said motor shaft with sufficient remaining axial clearance to allow said worm to turn within limits dictated by a coupling geometry of said worm and said washer.

6. The damping coupling mechanism as set forth in claim 5, wherein said coupling geometry allows the motor shaft to turn relative to said worm for a fraction of a revolution to gain inertia and speed before said washer begins to transmit torque to said worm.

7. A damping coupling mechanism for a geared actuator in a motor having a motor shaft, the mechanism comprising:
   a worm mounted to the motor shaft, said worm having a first end provided with a coupling element and a second end adjacent said motor;
   a thrust ring press-fit on the motor shaft between said second end of said worm and the motor;
   a washer press-fit on the motor shaft to engage said first end of said worm, said washer having a torque-transmitting element fitted with a shock-absorbing member that contacts said coupling element;
   wherein torque is transmitted from the motor shaft and said press-fit washer to said worm through said shock-absorbing member.

8. The damping coupling mechanism as set forth in claim 7, wherein said torque-transmitting element includes two projections, said shock-absorbing member including two O-rings, each fitted over a respective one of said two projections.

9. The damping coupling mechanism as set forth in claim 8, wherein said coupling element includes a pair of projections that intermesh with said two projections on said washer, said O-rings acting as a buffer therebetween.

10. The damping coupling mechanism as set forth in claim 7, wherein said washer is pressed onto said motor shaft with sufficient remaining axial clearance to allow said worm to turn within limits dictated by a coupling geometry of said worm and said washer.

11. The damping coupling mechanism as set forth in claim 10, wherein said coupling geometry allows the motor shaft to turn relative to said worm for a fraction of a revolution to gain inertia and speed before said washer begins to transmit torque to said worm.

* * * * *